Dec. 29, 1925.
S. KERSTEN
1,567,956
COMBINATION FAUCET CONNECTION
Filed Nov. 12, 1923    2 Sheets-Sheet 1
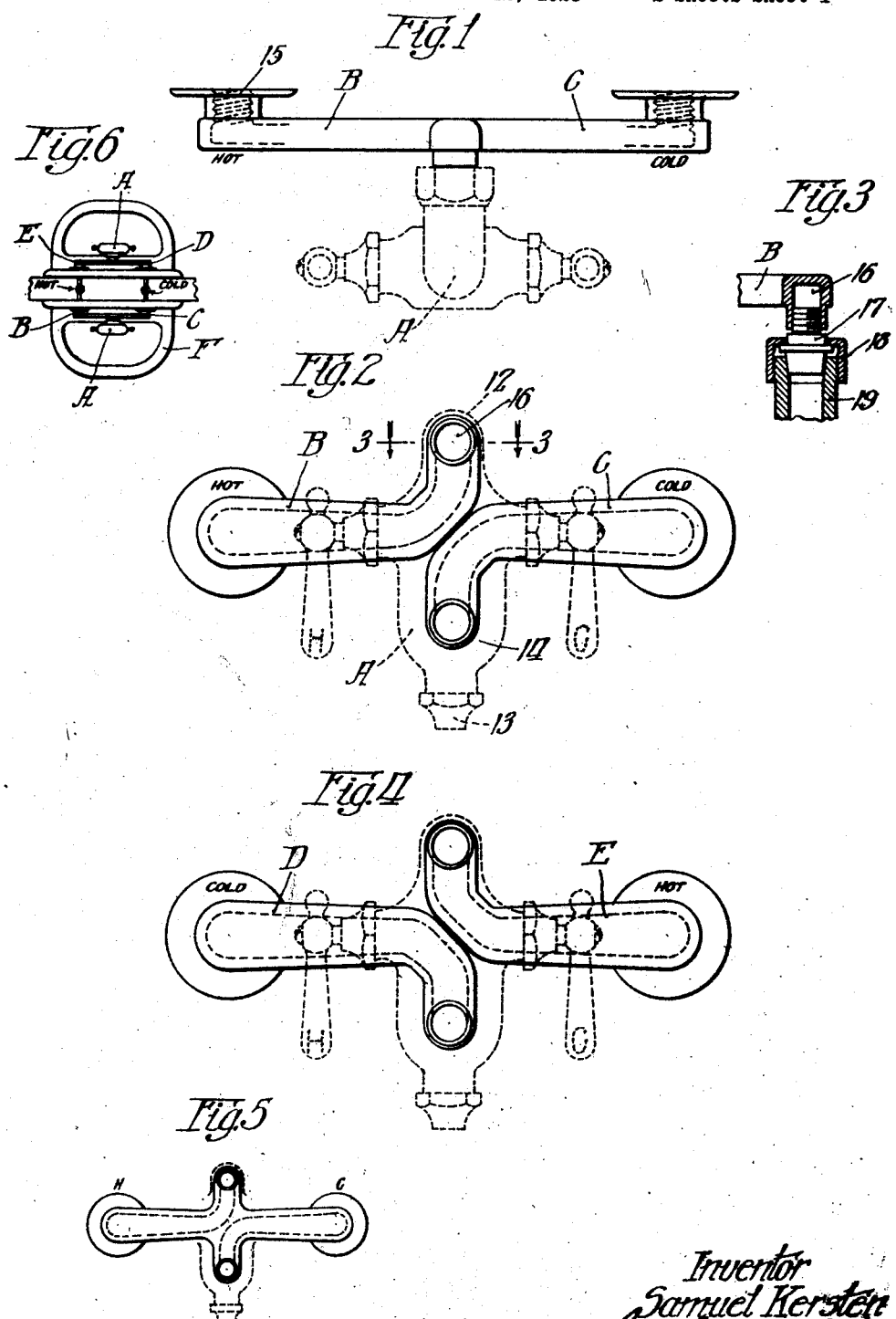
Inventor
Samuel Kersten Dec. 29, 1925.                                            1,567,956
S. KERSTEN
COMBINATION FAUCET CONNECTION
Filed Nov. 12, 1923         2 Sheets-Sheet 2
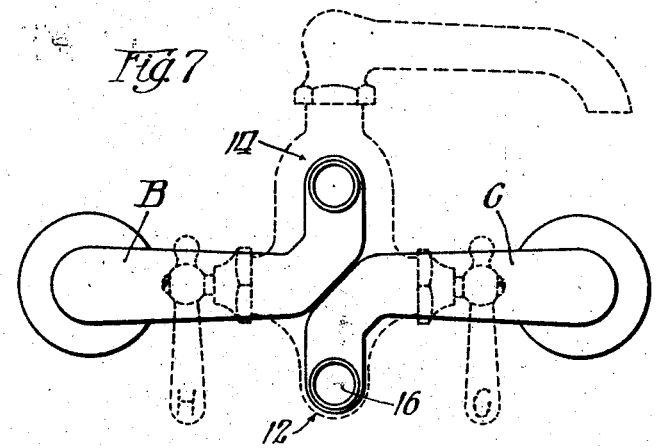
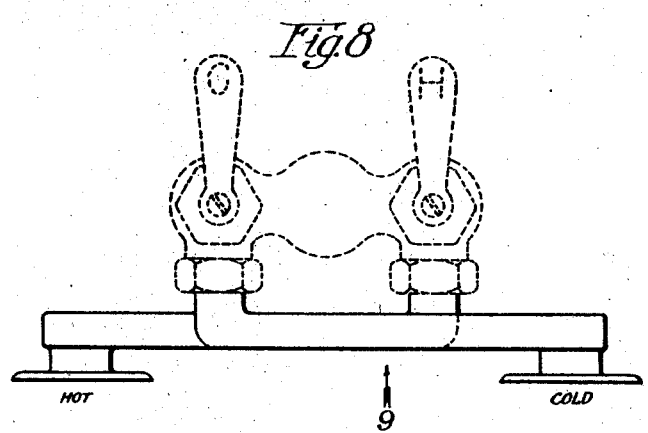
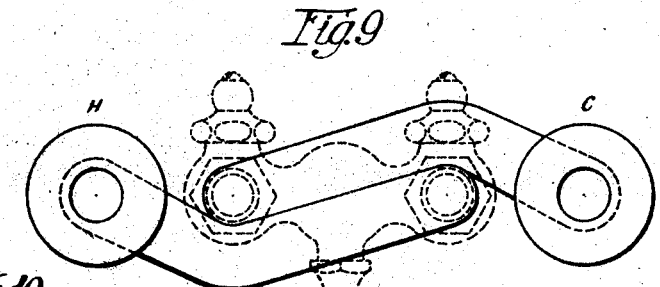
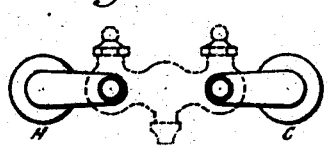
Inventor
Samuel Kersten
By Geo. E. Mueller Atty Patented Dec. 29, 1925.

1,567,956

UNITED STATES PATENT OFFICE.

SAMUEL KERSTEN, OF CHICAGO, ILLINOIS.

COMBINATION-FAUCET CONNECTION.

Application filed November 12, 1923. Serial No. 674,269.

*To all whom it may concern:*

Be it known that I, SAMUEL KERSTEN, a citizen of the United States, residing at Chicago, in the county of Cook and State of Illinois, have invented a certain new and useful Improvement in Combination-Faucet Connections, of which the following is a full, clear, concise, and exact description, reference being had to the accompanying drawings, forming a part of this specification.

My invention relates to combination faucet connections, and has to do more particularly with connecting elements adapted for readily applying combination faucets of the hot and cold type to the hot and cold supply pipes.

In installing combination faucets, it is standard to have the hot control lever or handle on the left and the cold control on the right of the faucet. In installing hot and cold supply pipes they are frequently run up between walls and the outlets arranged on standard centers, as for example eight-inch centers, to fit standard sink backs.

Frequently such supply pipes are run up through walls with sinks, wash-bowls, bath tubs, etc., placed on opposite sides of the wall with the supply pipes positioned between. In such cases the hot water supply pipes for one side of the wall would be on the left hand side, while on the opposite wall they would be on the right hand side. This would require either installing combination faucets or single hot and cold water faucets with one side standard and the other side reversed, or the latter side would require special plumbing inside the wall in order to attach the faucet or faucets with the hot control on the left.

One of the features of my invention is the provision of connecting elements interchangeable and readily applied, so that the faucet or faucets may be installed in the standard way, and particularly without special interior plumbing, or the installation of cross-over or jump-over fitings.

For a better understanding of my invention, reference is to be had to the accompanying drawings, in which:—

Fig. 1 is a plan view showing a combination faucet installed with my improved connection, the faucet being shown in dotted lines so as to more clearly bring out the connecting elements;

Fig. 2 is a face view of Fig. 1;

Fig. 3 is a sectional view along the line 3—3 of Fig. 2;

Fig. 4 is a front view of reversed connecting elements;

Fig. 5 is a modified form of my invention, in which the connecting elements are formed as one integral member;

Fig. 6 shows the method of using my improved connector for applying combination faucets to oppositely disposed washbowls, but maintaining the hot control on the left;

Fig. 7 shows another installation, in which the faucet has its outlet pointing upwardly;

Fig. 8 shows another type of combination faucet installed according to my invention;

Fig. 9 is a view of Fig. 8, looking in the direction of the arrow 9; and

Fig. 10 shows the faucet of Figs. 8 and 9 with connections for installing opposite to that of Figs. 8 and 9.

Referring now more in detail to the arrangement shown in Figs. 1 to 4, I provide a combination faucet A, as illustrated, of the type shown in my Patent No. 1,462,413 of July 17, 1923, in which the hot water inlet is controlled at the left by the lever or handle H, the inlet being at the top 12 and the outlet at 13. The cold inlet is controlled at the right by a lever C, the cold inlet being below the upper inlet at 14.

In order to attach the faucet to the hot and cold water supply pipes, I provide connecting elements such as B and C, or D and E of Fig. 4, depending upon the position of the outlets of the hot and cold water supply pipes relative to the inlets of the faucet.

These paired connector elements B—C or D—E may be constructed as separate portions, as indicated in Figs. 1 to 4, or cast as an integral member, as shown in Fig. 5, although I preferably use the form shown in Figs. 1 to 4.

Now as to the arrangement of Figs. 1 to 3, arms B and C are preferably identical in construction and I will describe arm B as illustrative thereof. I preferably cast this arm with an inlet at the wall plate 15 and an outlet at 16 connected by a passage 17 shown in dotted lines in Fig. 2. The inlet 15 is preferably threaded so as to receive the end of the outlet of the feed pipe, and in order to connect the end 16 with the faucet any suitable connection may be used, depending upon the faucet connection. In using it with the faucet illustrated, I provide a nipple 17 adapted to be inserted in the opening 16 of the arm, either being threaded in or sweated in. I have shown the nipple as threaded into the arm in Fig. 3. A nut 18 is placed over the nipple 17 before being attached to the arm, said nut being adapted to thread over the end of the inlet 19 of the faucet.

Arm C is identical with arm B, but being reversed in position so that the arms are positioned to connect the faucet, assuming that the pipe is installed according to the standard practice, that is, with the hot water feed pipe on the left and the cold water feed pipe on the right.

Assuming that faucets such as A are to be installed back to back in connection with wash-bowls, as shown in Fig. 6 for illustration, and assuming that the hot and cold water supply pipes are carried up through the walls of the building as shown, that is, in standard relation to the bowl F with the hot water supply pipe on the left and the cold water on the right. In such case the plumber simply takes two of the appropriate connectors as B and C for the standard installation at bowl F and threads each connector on to the outlet of its feed pipe at the wall plate 15. The connectors then are positioned as shown in Fig. 2 and the faucet readily applied by the nipples 17 and nuts 18.

It will thus be seen that at wash-bowl F the faucet A is installed with the hot water control on the left, according to standard practice.

Assuming now that a faucet is to be installed at the opposite bowl G, in which the hot and cold supply pipes are of course reversed according to standard practice. In order to maintain the control of the hot water on the left at faucet A and bowl 6, the plumber simply takes the reversed connectors as D and E and connects the faucet as shown in Figs. 6 and 4.

Thus, although at bowl G the supply pipes are reversed according to standard practice by using the proper pair of connectors as D and E, the hot water is controlled at the left hand of the faucet.

It will thus be apparent that by the use of the interchangeable connections, the plumber may readily connect the combination faucet with the supply pipes, whether they correspond with or are in positions reversed relative to the inlets according to standard practice.

Assuming that a faucet is to be installed with an overhead spout, as indicated by the dotted lines in Fig. 7, or the faucet is to be installed reversed for shower or other purposes, the hot water may still be maintained under control at the left handle by using the proper connectors. As shown in Fig. 7, and assuming that the hot water supply pipe is at the left and the cold water supply pipe is at the right, with the faucet reversed, and desiring hot water control at the left handle, marked H, this particular handle being in control of inlet 14 of the faucet, connectors B—C are used. If the supply pipes are reversed to the position shown in Fig. 7, as for example if a faucet is to be installed on the wall opposite that shown in Fig. 7, in order to keep the hot water control on the left according to standard practice, the plumber would simply take the other connectors, as D and E.

In Figs. 1 to 7 I have shown the means of applying my invention to one form of combination faucet, that is, in which the inlets are in vertical alignment.

In Figs. 8 to 10 I show the method of applying my invention in connection with a combination faucet in which the inlets are in horizontal alignment.

In the latter type of combination faucet, in installing it so as to maintain the hot water control on the left and assuming the hot water supply pipe is on the left and the cold water supply pipe on the right, connectors as shown in Fig. 10 are used. To apply the faucet to the opposite wall, for example in the manner shown in Fig. 6, I use reversed connectors as shown in Figs. 8 and 9. Thus, whether installed as in Figs. 8 and 9 or as in Fig. 10, the horizontal type of combination faucet may be maintained with the hot water control on the left according to standard practice.

What I claim as new and desire to secure by United States Letters Patent is:

1. In a combination faucet connection of the character described, a combination faucet having two rearwardly extending inlets for connecting with corresponding outlets of supply pipes, and interchangeable right and left reversible connections for interconnecting either inlet and either supply pipe whether the supply pipes correspond with or are in positions reversed relative to the inlets.

2. In a combination faucet connection of the character described, a combination faucet having two rearwardly extending inlets for connecting each with a definite one of two horizontally aligned outlets of adjacent vertically disposed supply pipes from which the outlets extend in pairs from opposite sides of the supply pipes, and interchangeable connections for interconnecting the corresponding inlets and outlets whether the supply pipes correspond with or are in positions reversed relative to the inlets.

3. In a combination faucet connection of the character described, a combination faucet having two rearwardly extending vertically aligned inlets for connecting with corresponding horizontally aligned outlets of adjacent vertically disposed supply pipes from which the outlets extend in pairs from opposite sides of the supply pipes, and interchangeable connections for interconnecting each inlet to the outlet of its corresponding supply pipe on either side of the supply pipes.

4. In a combination faucet connection of the character described, a combination faucet having definite hot and cold inlets for connecting with corresponding laterally disposed outlets of hot and cold supply pipes and having a hot inlet control handle on the left and a cold inlet control handle on the right, and interchangeable connections for interconnecting the hot and cold inlets and hot and cold outlets of the supply pipes whether the hot water supply oulet is to the left of the cold water supply outlet, or vice versa.

5. In a combination faucet connection of the character described, a combination faucet having definite hot and cold inlets for connecting with corresponding laterally disposed outlets of hot and cold supply pipes and having a hot inlet control handle on the left and a cold inlet control handle on the right, and interchangeable reversible arms each having an inlet and an outlet for interconnecting the hot and cold water inlets and hot and cold outlets of the supply pipes, said arms extending laterally from the faucet and reversible to connect the corresponding hot and cold inlets and outlets whether the hot water supply outlet is to the left of the cold water supply outlet, or vice versa.

6. In a combination faucet connection of the character described, a combination faucet having definite hot and cold inlets for connecting with corresponding laterally disposed outlets of hot and cold supply pipes and having a hot inlet control handle on one side and a cold inlet control handle on the other side, and right and left interchangeable reversible connectors having inlets and outlets for interconnecting the hot and cold inlets and hot and cold outlets of the supply pipes, depending upon the position of the supply pipe outlet to the right or to the left of the faucet.

In witness whereof, I hereunto subscribe my name this 8th day of October, 1923.

SAMUEL KERSTEN.